United States Patent Office 3,187,052
Patented June 1, 1965

3,187,052
PROCESS FOR PREPARING PHENOLS AND CARBONYL ALKANES
Dorsey C. Nelson, Springfield, and Max B. Mueller, Media, Pa., assignors to Allied Chemical Corporation, New York, N.Y., a corporation of New York
No Drawing. Filed Apr. 26, 1960, Ser. No. 24,661
5 Claims. (Cl. 260—593)

This invention relates to a process for decomposing aralkyl alpha-hydroperoxides.

It is known that aralkyl hydroperoxides decompose to the corresponding phenol and aldehyde or ketone in the presence of sulfuric acid, sulfur dioxide, hydrochloric acid and the like.

Such processes produce phenolic products which are often contaminated with impurities, presumably sulfates, chlorides, etc., which tend to hinder subsequent hydrogenation reactions, for example, conversion of phenol to cyclohexanone by hydrogenation in the presence of catalysts such a palladium, platinum and nickel by "poisoning" or inactivating the catalyst after short periods of contact therewith. Hydrogenation of such contaminated products would require excessive amounts of catalysts to be used to compensate for the poisoning action of such impurities. Such phenolic products consequently are usually purified prior to hydrogenation, to remove sufficient quantities of the impurities to permit use of economically small quantities of catalyst and periods of catalyst use without poisoning.

It is an object of the present invention to provide a process for producing phenols of high purity by the decomposition of aralkyl alpha-hydroperoxides.

A further object of the invention is to provide a process for producing phenolic products which have low tendencies to "poison" conventional hydrogenation catalysts.

A still further object of the invention is to provide phenolic products capable of hydrogenation to cyclohexane derivatives with the use of low concentrations of hydrogenation catalysts.

These and other objects are accomplished according to our invention wherein an aralkyl alpha-hydroperoxide having the formula

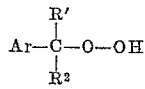

wherein Ar is an aromatic or chlorinated aromatic ring, and R' and R² taken individually are hydrogen or alkyl groups, or taken jointly with the intermediate carbon atom constitute a cycloalkyl radical, is subjected in liquid phase to cleavage by the catalytic action of a heteropoly acid such as phosphomolybdic acid.

Preferred hydroperoxides decomposed in accordance with our invention are hydroperoxides of mono and diisopropyl benzenes and toluenes to the corresponding phenol and acetone. Our process applies generally, however, to aralkyl alpha-hydroperoxides of the above formula especially lower alkyl hydroperoxides including isopropyldichloro benzene alpha hydroperoxide; ethyl benzene alpha-hydroperoxide; isopropyl toluene alpha-hydroperoxide; cyclohexyl benzene alpha-hydroperoxide; the diisopropyl benzene hydroperoxides; the isopropyl- and diisopropyl-naphthalene; isopropyl-, methylisopropyl-, and diisopropyl-diphenyl hydroperoxides, etc.

In the description of the process which follows, the invention will be illustrated by the decomposition of cumene hydroperoxide (isopropyl benzene alpha-hydroperoxide) but is to be understood not to be limited thereto but to apply also to the aralkyl alpha hydroperoxides of the general formula shown. The specific reaction involved when cumene hydroperoxide is used is given below.

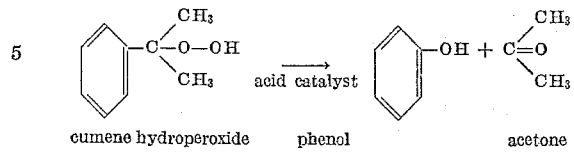

cumene hydroperoxide    phenol    acetone

In carrying out the decomposition process according to our invention the cumene hydroperoxide used may be the pure hydroperoxide, or it may be the crude reaction product of the oxidation of cumene to cumene hydroperoxide which may contain, for example, 25% to 60% cumene hydroperoxide, together with cumene and a little acetophenone and dimethyl phenyl carbinol. The crude reaction product may also contain catalysts, conditioning agents and the like, e.g. alkali and/or alkaline earth carbonate suspended therein in finely divided form. Alternatively the crude reaction product used may be concentrated by distillation therefrom of part or all of the unreacted cumene prior to carrying out the cleavage operation. Such concentrated mixtures may contain, for example, between about 60% and about 90% cumene hydroperoxide.

Preferably the heteropoly acid, dissolved in alcohol or other suitable solvent, such as the phenol or carbonyl alkane end product of the subsequent reaction, is added to the cumene hydroperoxide solution in sufficient quantity to provide a concentration of between about 100 and about 800 parts per million of the heteropoly acid, based on the weight of the total solution, heated to a temperature in the range between about 40° C. and about 90° C. and allowed to react, preferably with agitation. The resulting reaction product is treated with an alkaline material such as sodium bicarbonate and filtered or preferably contacted with a strongly basic ion exchange resin, to remove the acid catalyst, and phenol and acetone are separated as by distillation.

Suitable heteropoly acids are those inorganic acids which include a plurality of acidic radicals and which include an acidic radical of at least one metal element and an acidic radical of at least one other, preferably non-metallic, element. Such heteropoly acids are inorganic complexes of high molecular weight comprising a nuclear element which is usually phosphorus, silicon, boron or arsenic, surrounded by a coordinated group of other metallic oxide or oxides such as one or more of the oxides of tungsten, molybdenum, vanadium, chromium, sulfur, selenium and tellurium. Such heteropoly acids are described in U.S.P. 2,630,456, issued March 3, 1953 to Edward R. Bell and William E. Vaughan.

Phosphomolybdic acid is the preferred acid used in the process of our invention but we may also use other heteropoly acids in the above category including phosphotungstic acid, borotungstic acid, silcotungstic acid, silicomolybdic acid, and the like.

The phenolic products obtained by the decomposition of the aralkyl alpha hydroperoxides with the heteropoly acids of our invention contain fewer impurities of the type which tend to "poison" hydrogenation catalysts so that for many purposes purification of the thus produced phenols prior to hydrogenation is not necessary for economic catalyst utilization. Thus, when unpurified phenols obtained using conventional catalysts including sulfur dioxide or perchloric acid are subjected to hydrogenation over a palladium catalyst, the reaction will usually terminate due to catalyst inactivation when the conversion to cyclohexanone is only about half complete when using the normal catalyst charge of about 0.1%, based on the weight of the phenolic compound, and will cease after only about 25% conversion if the proportion of catalyst is reduced to 0.05%. On the other hand, phenols prepared using the heteropoly acid catalyst of our invention can be hydrogenated to complete conversion by the use of only 0.05% palladium catalyst without poisoning of the catalyst in a normal 270 minute hydrogenation cycle.

The following examples further illustrate our invention. Parts are by weight except as otherwise noted.

EXAMPLE 1

A pilot plant run for the production of phenol from cumene hydroperoxide was carried out as follows:

A feed liquor comprising 80–83 weight percent of cumene hydroperoxide, the balance mainly cumene with a small quantity of α,α-dimethylphenyl carbinol was pumped at a rate of 250 parts per hour into a continuous-type decomposer having a hold-up capacity of 100 parts. The contents of the decomposer were stirred mechanically and were maintained by thermostat at a temperature of 77° C. Simultaneously a catalyst solution consisting of 1% phosphomolybdic acid ($20MoO_3 \cdot 2H_3PO_4 \cdot 48H_2O$) was fed continuously into the decomposer at a rate of 2.5 parts per hour corresponding to a catalyst level of 100 p.p.m. Solvent for the phosphomolybdic acid was a portion of the mixed reaction products of a cumene hydroperoxide decomposition containing approximately 50 mol percent each of acetone and phenol with small quantities of cumene and water. The reaction products issuing from the decomposer were passed through a dehydrator where the temperature was raised to 130° C. over a contact time of 5 to 10 minutes. Carbinol present in the cumene hydroperoxide feed was thus converted to alpha-methylstyrene and water. The dehydrator was connected directly to a column containing freshly regenerated basic ion exchange resin where the acid catalyst became neutralized. The effluent from the ion exchange column was passed directly into the middle plate of a 20 plate fractionation column where acetone was distilled overhead and the phenol concentrate was collected as "bottoms." The temperature of the column "reboiler" was held at 150–160° C. The bottoms were charged batchwise to a 4 foot x 2 inch packed column and fractionally distilled at reduced pressure. Cumene, alpha-methylstyrene, phenol and acetophenone cuts were collected in that order. After establishment of equilibrium, 12,619 parts of cumene hydroperoxide concentrate containing 81.5 percent by weight of hydroperoxide was processed. From this were collected 6,134 parts of phenol and 3,893 parts of acetone, corresponding to mole percent yields of 96.5 and 96.1% for phenol and acetone, respectively.

Similarly, runs were made using sulfur dioxide and perchloric acid as decomposition catalysts for comparison. Decomposition temperatures and catalyst concentrations employed were those previously found optimum for these catalysts. Mole percent yields of phenol were 94.7 and 93.4% for sulfur dioxide and perchloric acid catalyzed runs, respectively.

Samples of the phenol prepared by the above catalysts were analyzed for purity, sulfur content, chloride content and color stability in accordance with standard testing procedures, with the results shown in Table I below.

Table I

A COMPARISON OF PHENOLS OBTAINED USING VARIOUS CATALYSTS

| Catalyst | Phenol Yield (Mole Percent) | Purity (Percent) | Sulfur (p.p.m.) | Chloride (p.p.m.) | Color Units | |
|---|---|---|---|---|---|---|
| | | | | | Before Heating | After Heating |
| Phosphomolybdic Acid | 96.5 | 99.60 | 9.3 | 2.0 | 3.5 | 7.0 |
| $SO_2$ | 94.7 | 99.48 | 7.0 | 1.1 | 5.0 | 8.0 |
| Perchloric Acid | 93.4 | 99.48 | | 3.5 | 4.0 | 7.0 |

Samples of the phenols prepared by the three catalysts above, were hydrodgenated over a palladium catalyst. The phosphomolybdic acid catalyzed phenol was found superior to the $SO_2$ catalyzed phenol and compared favorably with results obtained with the perchloric catalyzed phenol and with a $SO_2$ catalyzed phenol which had been subjected to a purification treatment to remove catalyst poisons, as shown in Table II below.

Table II

COMPARISON OF HYDROGENATION DATA USING PHOSPHOMOLYBDIC ACID CATALYZED PHENOL AND USING $SO_2$ CATALYZED PHENOL AND A PURIFIED PHENOL

| Phenol Catalyst | Percent Pd. Cat. | Hydrogenation Cycle (Minutes) | Percent Converted |
|---|---|---|---|
| Phosphomolybdic | 0.05 | 270 | >99.5 |
| $SO_2$ | 0.05 | 360 | 77 |
| $SO_2$ Purified | 0.10 | 150 | >99.5 |
| $SO_2$ Purified | 0.05 | 270 | >99.5 |
| Perchloric | 0.10 | 150 | >99.5 |

EXAMPLE 2

To a continuous-type decomposition reactor equipped with stirrer and condenser was charged at 77° C. a small quantity of a synthetic cumene hydroperoxide decomposition material as reaction medium, composed essentially of acetone and phenol in substantially equimolar proportions together with small quantities of cumene and water. A 77.5% solution of cumene hydroperoxide (the balance mainly cumene) was added continuously at such a rate as to give a total contact time of 25 to 30 minutes at about 77° C. At the same time a 2% solution of phosphotungstic acid dissolved in a cumene hydroperoxide decomposition mass (mainly phenol and acetone) was added intermittently so as to maintain a phosphotungstic acid concentration level of 800 p.p.m.

The resulting reaction mass contained 3 to 4% residual cumene hydroperoxide which disappeared (by conversion to phenol and acetone) on standing for several hours. The decomposition mass was then treated with excess sodium bicarbonate to neutralize the acid catalyst, filtered and charged to a two-foot fractionating column for distillation at reduced pressures. In this manner 885 parts of 77.5% cumene hydroperoxide solution was processed. From the fractionation column were recovered 369 parts of phenol and 239 parts of acetone. This is equivalent to 87.0 and 91.5 mole percent yields of phenol and acetone, respectively. The purity of the recovered phenol was similar to that of the product obtained in Example 1 above.

EXAMPLE 3

The procedure of Example 2 was repeated except that a 2% solution of silicotungstic acid was substituted for the phosphotungstic acid of Example 2. Using the same condition as described in Example 2, decomposition of the cumene hydroperoxide was substantially complete, there being 3 to 4% cumene hydroperoxide in the decomposition effluent which was converted to phenol and acetone on standing. A total of 845 parts of 77.5 weight percent cumene hydroperoxide solution was thus processed. Using the recovery procedure described in Example 2, a total of 338 parts of phenol and 185 parts of acetone were obtained. This is equivalent to 83.5 and 74.0 mole percent for phenol and acetone, respectively. The purity of the recovered phenol was similar to that of the product obtained in Example 1.

EXAMPLE 4

To a continuous-type decomposition reactor was charged 2003.0 parts of 22.5 weight percent of 3,4-dichlorocumene hydroperoxide solution. At the same time there was added a 2% solution of phosphomolybdic acid dissolved in a 50:50 molar solution of phenol and acetone. The rates of addition of hydroperoxide and catalyst solutions were such as to give a contact interval of 20 minutes and a catalyst concentration of 400 p.p.m.

Reaction temperature of 77° C. was maintained and agitation was carried out with a mechanical stirrer. The resulting reaction product effluent, containing less than 1% of cumene hydroperoxide, was passed through an ion-exchange column containing a basic ion exchange resin for removal of acid catalyst. Products were recovered by fractional distillation in a two-foot packed column at reduced pressures. There were thus collected 232 parts of 3,4-dichlorophenol and 119 parts acetone. This is equivalent to 69.8 and 99.9 mole percent yields of 3,4-dichlorophenol and acetone, respectively. The purity of the recovered phenol was similar to that of the product obtained in Example 1.

While the above describes the preferred embodiments of our invention it will be understood that departures may be made therefrom within the scope of the specification and claims.

We claim:

1. In a process for decomposing an aralkyl alpha-hydroperoxide having the formula

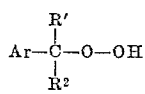

wherein Ar denotes a member selected from the group consisting of aromatic hydrocarbon and chlorinated aromatic hydrocarbon radicals, and $R'$ and $R^2$ taken individually are members selected from the group consisting of hydrogen and alkyl groups, and taken jointly with the intermediate carbon atom constitute a cycloalkyl group, to the corresponding phenol and carbonyl alkane, the improvement of minimizing the formation of impurities which exert a poisoning action on hydrogenation catalysts in the subsequent hydrogenation of said phenol by contacting the hydroperoxide in liquid phase with an inorganic heteropoly acid to catalyze the decomposition.

2. The process according to claim 1 wherein the heteropoly acid is phosphomolybdic acid.

3. The process according to claim 1 wherein the aralkyl alpha-hydroperoxide is isopropylbenzene alpha-hydroperoxide.

4. The process according to claim 2 wherein the hydroperoxide is isopropylbenzene alpha-hydroperoxide.

5. In a process for decomposing isopropylbenzene alpha-hydroperoxide into phenol and acetone, the improvement of minimizing the formation of impurities which exert a poisoning action on hydrogenation catalysts in the subsequent hydrogenation of said phenol by contacting a liquid mixture containing between about 25% and about 90% of isopropylbenzene alpha-hydroperoxide, the remainder essentially cumene, with a quantity of phosphomolybdic acid to provide between about 100 parts and about 800 parts of phosphomolybdic acid per million parts of liquid reaction mixture at a temperature between about 40° C. and about 90° C. until at least a portion of the isopropylbenzene alpha-hydroperoxide has been converted to a mixture of phenol and acetone.

References Cited by the Examiner

UNITED STATES PATENTS

| | | | |
|---|---|---|---|
| 2,628,983 | 2/53 | Aller et al. | 260—593 X |
| 2,630,456 | 3/53 | Bell et al. | 260—610 |
| 2,683,751 | 7/54 | Filar | 260—593 X |

OTHER REFERENCES

Ephraim: Inorganic Chemistry (4th ed.), p. 507 (1943).

LORRAINE A. WEINBERGER, *Acting Primary Examiner.*

CHARLES B. PARKER, LEON ZITVER, *Examiners.*